(12) United States Patent
Morrison et al.

(10) Patent No.: US 7,427,017 B2
(45) Date of Patent: Sep. 23, 2008

(54) METHOD AND SYSTEM FOR COLLECTING BANK ACCOUNT INFORMATION FROM AN INDIVIDUAL AND AUTHENTICATING THE INDIVIDUAL PRIOR TO ALLOWING THE BANK ACCOUNT TO RECEIVE AN ELECTRONIC FUND TRANSFER

(75) Inventors: Richard James Morrison, Little Rock, AR (US); Brett Lawrence Hacker, Alexander, AR (US); Alan Keith Gardner, Little Rock, AR (US); Teresa Simmons Wheeler, Maumelle, AR (US); Gennifer-Rebekka Jackson, Little Rock, AR (US); Beryl Eugene Jones, Little Rock, AR (US)

(73) Assignee: Remettra, Inc., Little Rock, AR (US)

( * ) Notice: Subject to any disclaimer, the term of this patent is extended or adjusted under 35 U.S.C. 154(b) by 166 days.

(21) Appl. No.: 11/445,460

(22) Filed: Jun. 2, 2006

(65) Prior Publication Data
US 2006/0293989 A1 Dec. 28, 2006

Related U.S. Application Data

(60) Provisional application No. 60/692,582, filed on Jun. 22, 2005.

(51) Int. Cl.
*G06K 40/00* (2006.01)
*G07D 11/00* (2006.01)
*G07F 19/00* (2006.01)

(52) U.S. Cl. .................... 235/379; 235/375; 705/44

(58) Field of Classification Search ............. 235/379, 235/382, 487; 705/40, 1, 38, 42, 44
See application file for complete search history.

(56) References Cited

U.S. PATENT DOCUMENTS

| | | | |
|---|---|---|---|
| 5,158,155 A | 10/1992 | Domain et al. | |
| 5,920,847 A | 7/1999 | Kolling et al. | |
| 6,497,358 B1 | 12/2002 | Walsh | |
| 6,993,507 B2 | 1/2006 | Meyer et al. | |
| 2001/0018739 A1* | 8/2001 | Anderson et al. | 713/176 |
| 2002/0087469 A1 | 7/2002 | Ganesan et al. | |
| 2002/0133459 A1* | 9/2002 | Polk et al. | 705/40 |
| 2002/0165800 A1* | 11/2002 | Ogura et al. | 705/27 |
| 2003/0158791 A1* | 8/2003 | Gilberto et al. | 705/27 |

(Continued)

*Primary Examiner*—Edwyn Labaze
(74) *Attorney, Agent, or Firm*—Shlesinger, Arkwright & Garvey LLP (57) ABSTRACT

A computer-implemented method for collecting bank account information from an individual and authenticating the individual prior to allowing the bank account to receive an electronic fund transfer comprises providing a website; allowing the individual on the website to enter bank account information to which funds will be transferred; delivering application forms with a unique bar-coded identifier over the internet to the individual; electronically receiving and storing the application forms after being completed by the individual and linking the bar coded identifier with the individual's bank account information; visually comparing by at least first and second customer support representatives information provided on the forms with information provided on the website to verify the identity of the individual; and validating payment to the individual if the individual's identity is verified.

15 Claims, 10 Drawing Sheets

U.S. PATENT DOCUMENTS

| | | |
|---|---|---|
| 2004/0049455 A1 | 3/2004 | Mohsenzadeh |
| 2005/0015337 A1 | 1/2005 | Washington |
| 2005/0027654 A1* | 2/2005 | Adrian ........................ 705/40 |
| 2005/0060201 A1 | 3/2005 | Connely, III et al. |
| 2005/0131813 A1 | 6/2005 | Gallagher et al. |
| 2005/0192897 A1 | 9/2005 | Rogers et al. |
| 2005/0222952 A1 | 10/2005 | Garrett et al. |
| 2005/0267842 A1 | 12/2005 | Weichert et al. |
| 2006/0072822 A1 | 4/2006 | Hatzav et al. |
| 2008/0015887 A1* | 1/2008 | Drabek et al. .................. 705/1 |

* cited by examiner

FIG. 1

MedRemit Bank Account Verification Forms Package

---
Sender's Full Name *(Must match full name used during registration)*

---
Date ( ) ______________
Phone Number

In order to complete your bank account registration for MedRemit electronic funds transfers, you must complete the three pages contained in this forms package and fax these pages to our bank account verification center. Please follow the instructions below:

Instructions:

1. If not already, print the three pages of this forms package.
2. Complete the information at the top of this page (page 1).
3. In the designated location on page 2, please place a cancelled check from the same commercial bank account for which you earlier entered information during your MedRemit session. If you are registering a savings or other account type, please place a deposit receipt showing the account and routing numbers in the location designate for the cancelled check.
4. In the designated location on page 2, please place a copy of your state driver's license. The information from the driver's license MUST match both the full name entered above and the name of the person who initiated this bank account registration using their MedRemit login. This person must also be authorized to complete the ACH authorization form (page 3) on behalf of the organization or entity registering this bank account.
5. Complete the ACH authorization form on page 3 that authorizes Remettra to direct deposit payments into the company's bank account.
6. Fax a clear copy of all three pages to our bank account verification center's automated fax system, <insert appropriate fax number here>. DO NOT send a cover page.

Once our bank account verification center staff completes their review, you will be notified via email and your newly registered bank account will be available for electronic funds transfers.

If you do not receive an email within 48 hours of faxing this forms package, please contact MedRemit Customer Services via email at support@remettra.com or toll-free at (866) 226-9641.

ACH Authorization Form

I (we) ________________________, hereby authorize Remettra, Inc., hereinafter called
           Company Name
REMETTRA, to initiate credit entries to my (our) commercial (select one) ☐ Checking Account or ☐ Savings Account indicated below at the depository financial institution named below, hereafter called DEPOSITORY, and to credit the same to such account. I (we) acknowledge that the origination of ACH transactions to this account must comply with the provisions of U.S. law.

This authorization is to remain in full force and effect until Remettra has received a written notification from me (or other authorized representative) of its termination in such time and in such manner as to afford REMETTRA and DEPOSITOR a reasonable opportunity to act on it, or until REMETTRA notifies me that this service has been terminated. I understand that I must allow reasonable time for my instructions to be executed. I also understand that if REMETTRA credits more money than the correct amount to the specified bank account due to duplicate electronic funds transfers or erroneous electronic funds transfers, REMETTRA is authorized to reverse the overpayment.

Depository/Bank Name ________________________

Branch ________________________

City ____________, State ____ Zip ____

Account Name ________________________

Routing Number ________________________

Account Number ________________________

Your Name ________________________
          Please Print
Date ____________ Signature ________________________

E-mail ________________________

Signature of a designated officer within your organization:

Title ____________ Printed Name ________________________

Date ____________ Signature ________________________

METHOD AND SYSTEM FOR COLLECTING BANK ACCOUNT INFORMATION FROM AN INDIVIDUAL AND AUTHENTICATING THE INDIVIDUAL PRIOR TO ALLOWING THE BANK ACCOUNT TO RECEIVE AN ELECTRONIC FUND TRANSFER

CROSS-REFERENCE TO RELATED APPLICATIONS

This application claims the priority benefit of provisional application Ser. No. 60/692,582, filed Jun. 22, 2005, incorporated herein by reference.

BACKGROUND OF THE INVENTION

This invention relates generally to the field of banking and payments and more specifically to a method and system for collecting bank account information and securely linking an existing computer based electronic user account to those banking credentials for the purpose of authenticating the individual making such representations for making secure payments to the individual's bank account.

At the time of this invention, most business-to-business payments are made by check. This is slow and costly. We expect to reduce costs by making payments using the electronic banking system. In order to use that system, we must have a computer application and process in place to ensure, as best as possible, that payments are being directed to the desired payee. This application provides a way for accomplishing secure collection of bank account information as well as validation of the individual registering that bank account information. This is also to be accomplished over the Internet without face-to-face communication.

Prior systems simply use clerks to key faxed or mailed information and to complete a pre-authorization or "pre-note" transaction to verify that the account is valid. Perhaps, in some cases, a small value credit transaction is completed to verify that the specified account is receiving payment activity.

Also, with earlier systems only account information was collected, not identification information on the individual providing the banking information. Previously, it was a manual process to link the account with the paperwork submitted. Historically, a government issued photo ID has not been collected.

BRIEF SUMMARY OF THE INVENTION

It is an object of the present invention to provide a method and system to direct payments to the proper payee and diminish the potential for fraud by authenticating the individual providing a commercial or an individual's bank account information to which funds will be paid.

Other objects and advantages of the present invention will become apparent from the following descriptions, taken in connection with the accompanying drawings, wherein, by way of illustration and example, an embodiment of the present invention is disclosed.

In summary, the present invention provides a computer-implemented method for collecting bank account information from an individual and authenticating the individual prior to allowing the bank account to receive an electronic fund transfer, comprising:

a) providing a website;
b) allowing the individual to obtain a password protected user account at the website;
c) allowing the individual to sign on at the website using credentials created in step b);
d) allowing the individual to enter banking information to which funds will be transferred;
e) delivering application forms with a unique bar-coded identifier over the internet to the individual;
f) receiving and storing the application forms after being completed by the individual via a fax and linking the bar coded identifier with the individual's payee record;
g) visually comparing by at least first and second customer support representatives information provided on the forms with information provided at step d) to verify the identity of the individual; and
h) validating payment to the individual if the individual's identity is verified at step g).

The present invention also provides a system for collecting bank account information from an individual and authenticating the individual prior to allowing the bank account to receive an electronic fund transfer, comprising: a web server for allowing the individual to obtain a password protected user account; a registration data server for storing the individual's user account information, and banking account and routing numbers; an ABA validation server for validating the individual's banking and routing numbers; an email server for delivering a forms package to the individual via the internet; a fax server for receiving the forms package after being completed by the individual; a first workstation for providing side by side visual display of faxed information with the information provided by the individual during a previous online session to allow a first customer support representative to authenticate the identity of the individual; and at least a second workstation for providing side by side visual display of faxed information with the information provided by the individual during a previous online session to allow at least a second customer support representative to authenticate the identity of the individual, whereby approval by the first and the at least second customer support representatives are required to activate the individual's bank account for receiving payments.

DETAILED DESCRIPTION OF THE PREFERRED EMBODIMENTS

Detailed descriptions of the preferred embodiment are provided herein. It is to be understood, however, that the present invention may be broader and may be embodied in various forms. Therefore, specific details disclosed herein are not to be interpreted as limiting, but rather as a basis for the claims and as a representative basis for teaching one skilled in the art to make and use the present invention in virtually any appropriately detailed system, structure or manner.

Figure 1:
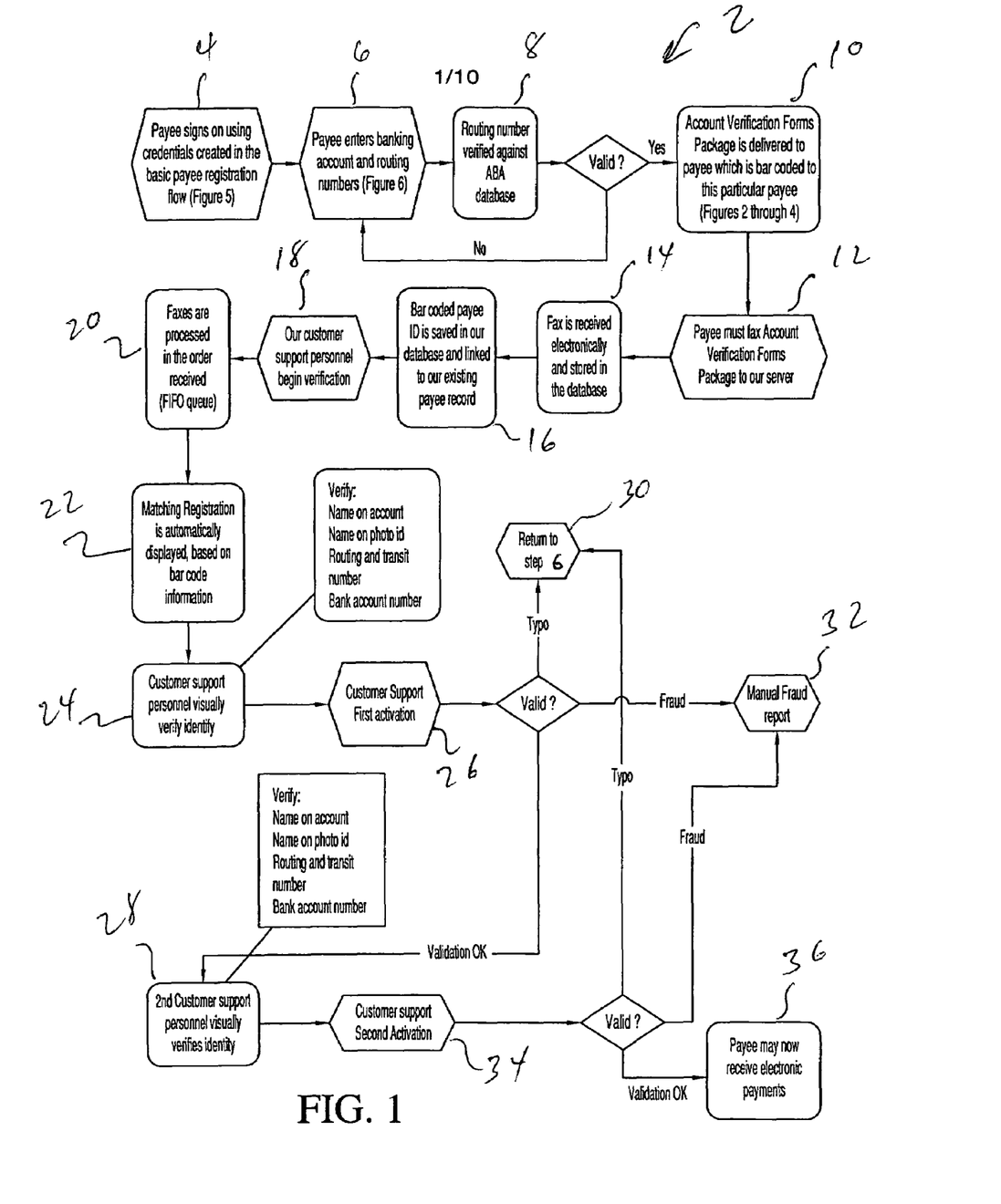
FIG. 1 is a flow chart of the method of an embodiment of the present invention.
Figure 5:
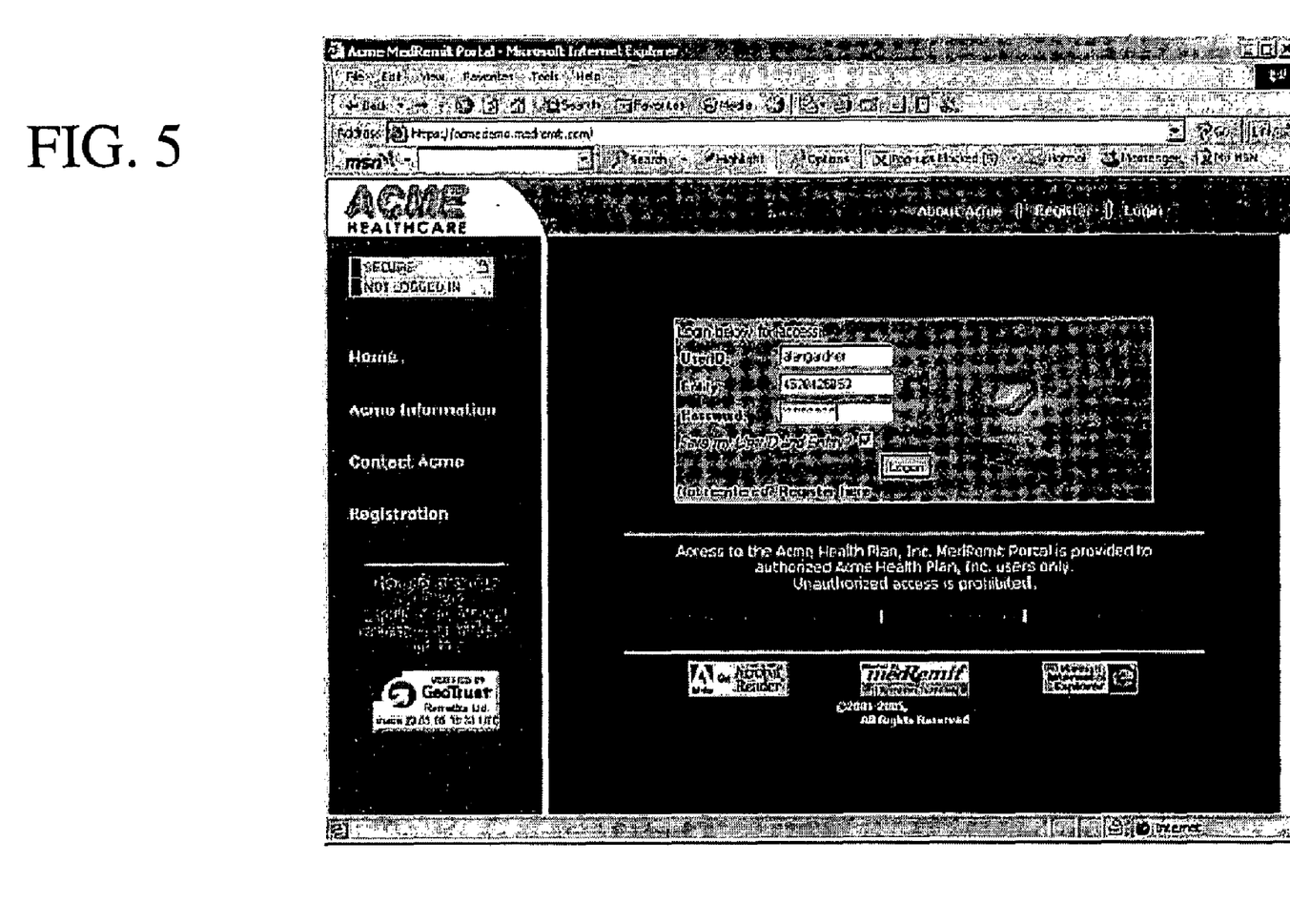
FIG. 5 is a screen print showing an example of a display presented to the user for signing on onto the website.
Figure 6:
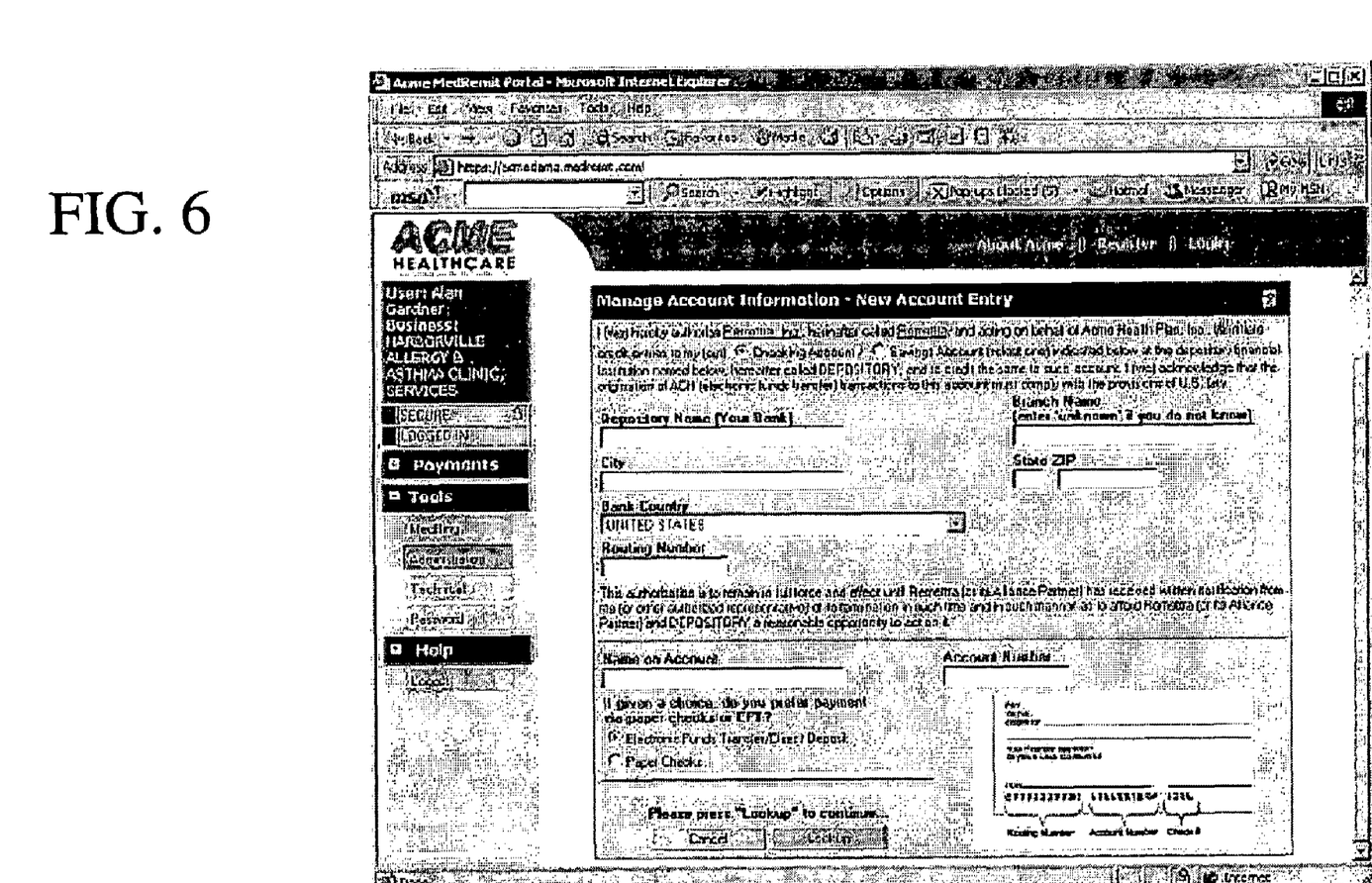
FIG. 6 is a screen print showing an example of a display presented to the user for entering bank account information.

Turning to FIG. 1, an embodiment of the present invention is a process 2 that starts after a user has already completed a secure general registration process whereby he has obtained an active user account by obtaining a user ID, entity identifier and password. The user is a payee or his representative requesting to receive payment to his bank account. Several common methods are available to reach this point in the process. In our system, the user types the secure URL of the system (HTTPS), enters his user name, entity identifier, and password at step 4. An example of a logon display presented to the user is shown in FIG. 5. After signing on, the user is offered the opportunity to register his banking account by entering the basic bank account information at step 6. An example of a display presented to the user for entering bank information is shown in FIG. 6. Typically this bank information is obtained from his check. The collected information is stored in a SQL database.

The process 2 validates at step 8 the routing and transit number (bank identifier) against an on-line database of valid bank identifiers. In some cases the user will be routed back to re-enter routing information should the information fail basic validity checking. If the banking information provided by the user is valid, an account verification forms package is generated and delivered to the user at step 10. The forms package contains a unique bar coded system identifier 11 (see FIGS. 3-4) specific to the user. The user is instructed to fill out and return the forms via fax at step 12.

Figure 2:
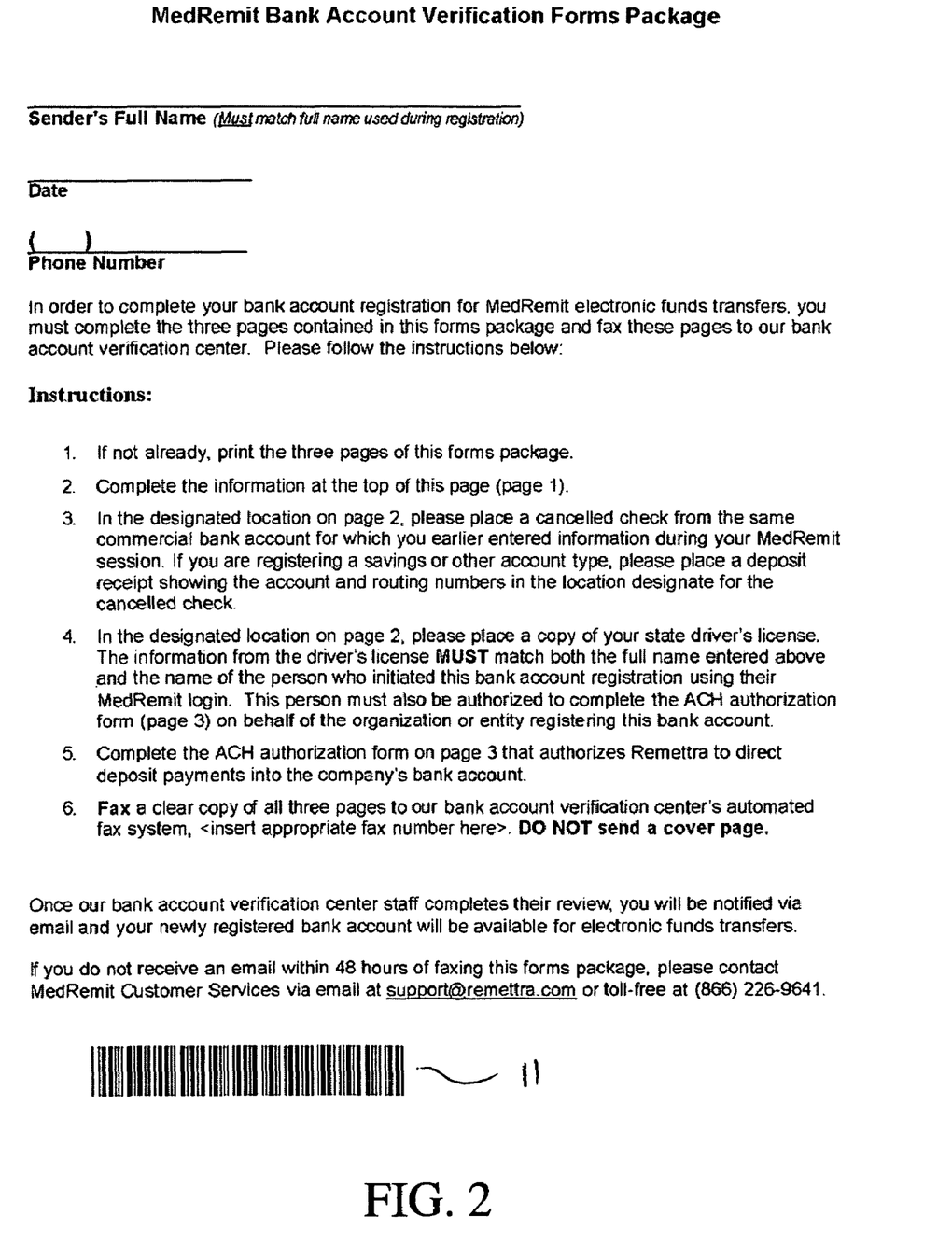
FIG. 2 is a bank account verification form used in the method of FIG. 1.
Figure 3:
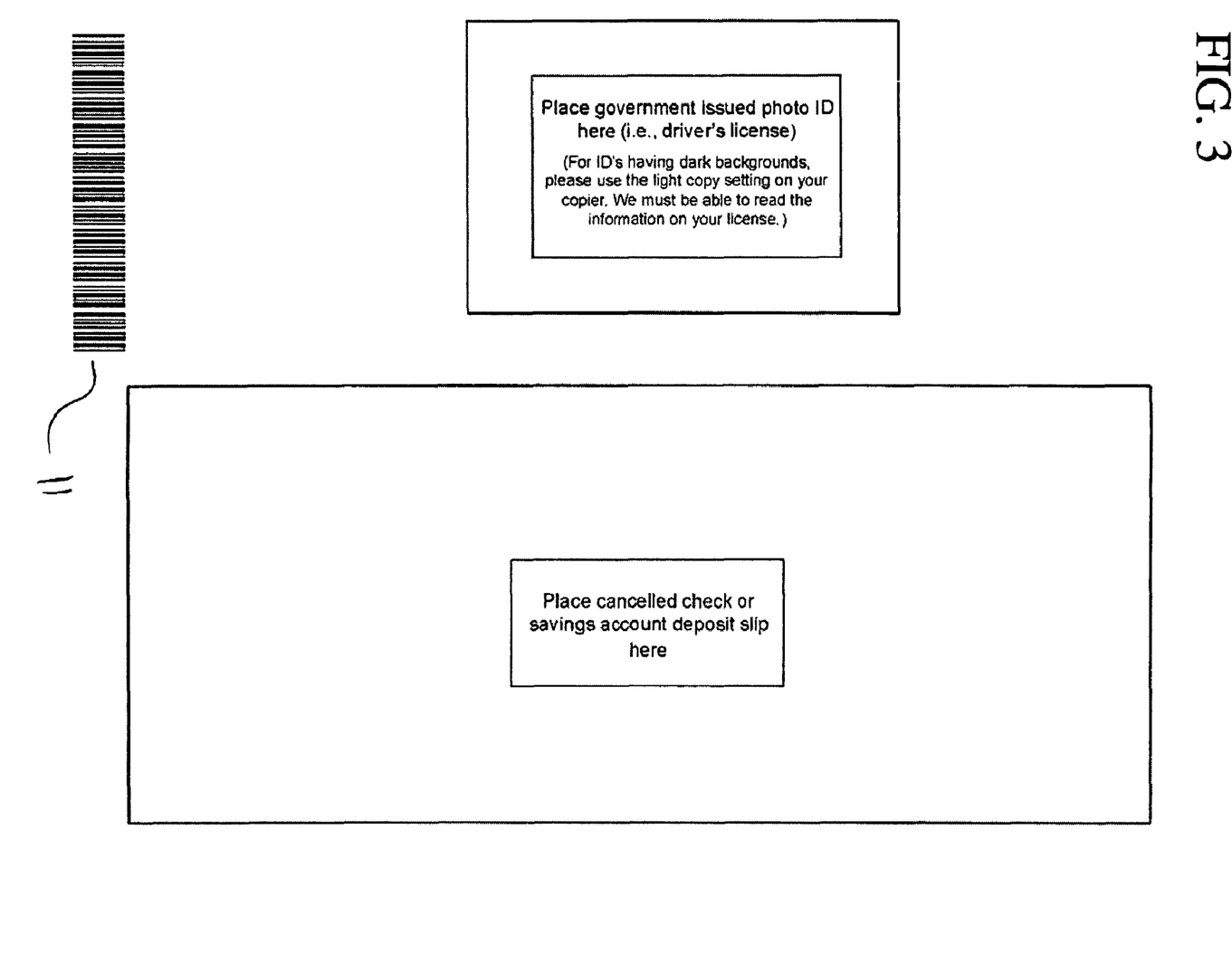
FIG. 3 is a registration images collection form used in the method of FIG. 1.
Figure 4:
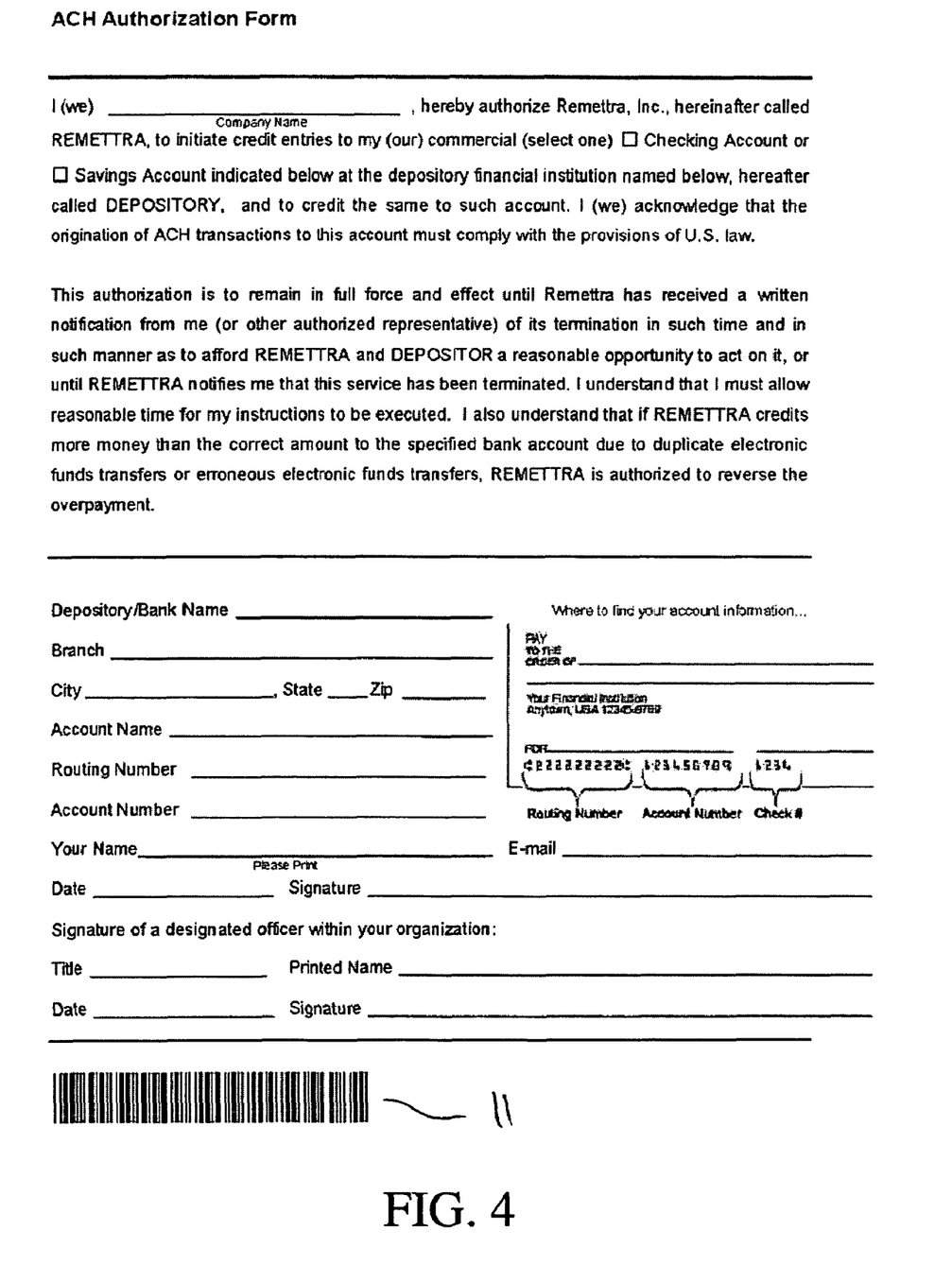
FIG. 4 is an ACH authorization form used in the method of FIG. 1.

The faxed forms, shown in FIGS. 2, 3, and 4, comprise our Bank Account Verification Forms Package. The package contains an instructions page shown in FIG. 2, a Registration Images Form shown in FIG. 3, and an ACH Authorization Form shown in FIG. 4. The instruction page requires the user's full name that matches the name used during registration, date and phone number. The registration images form requires a copy of a government issued photo ID, such as a driver's license and a cancelled check. The ACH authorization form requires bank account information to which payment is desired to be made. The Bank Account Verification Forms Package must be completed by the user and faxed to our fax server at step 12. The requirement to complete the Bank Account Verification Forms Package is presented to the user only after online capture of information is completed. The purpose of this is to possibly "catch" a fraudulent individual who may have started this process not realizing that a government issued photo ID and cancelled check information must be forwarded to complete the process.

When received by our server, the faxed forms package are stored at step 14 on the server in PDF format. The bar code ID 11 for the package is parsed from the fax images and linked to the existing user record in the SQL database at step 16 as a key to the image file, along with the calling telephone number, date and time. The bar code 11 is advantageously placed on the bottom of each page in the Bank Account Verification Forms Package in order to improve recognition. The system of the process 2 now includes an internet user account linked to a database record which contains the information necessary to activate payments to the checking or savings account, should the credentials be verified to be valid. Fax telephone numbers are an alternate linking field.

Figure 10:
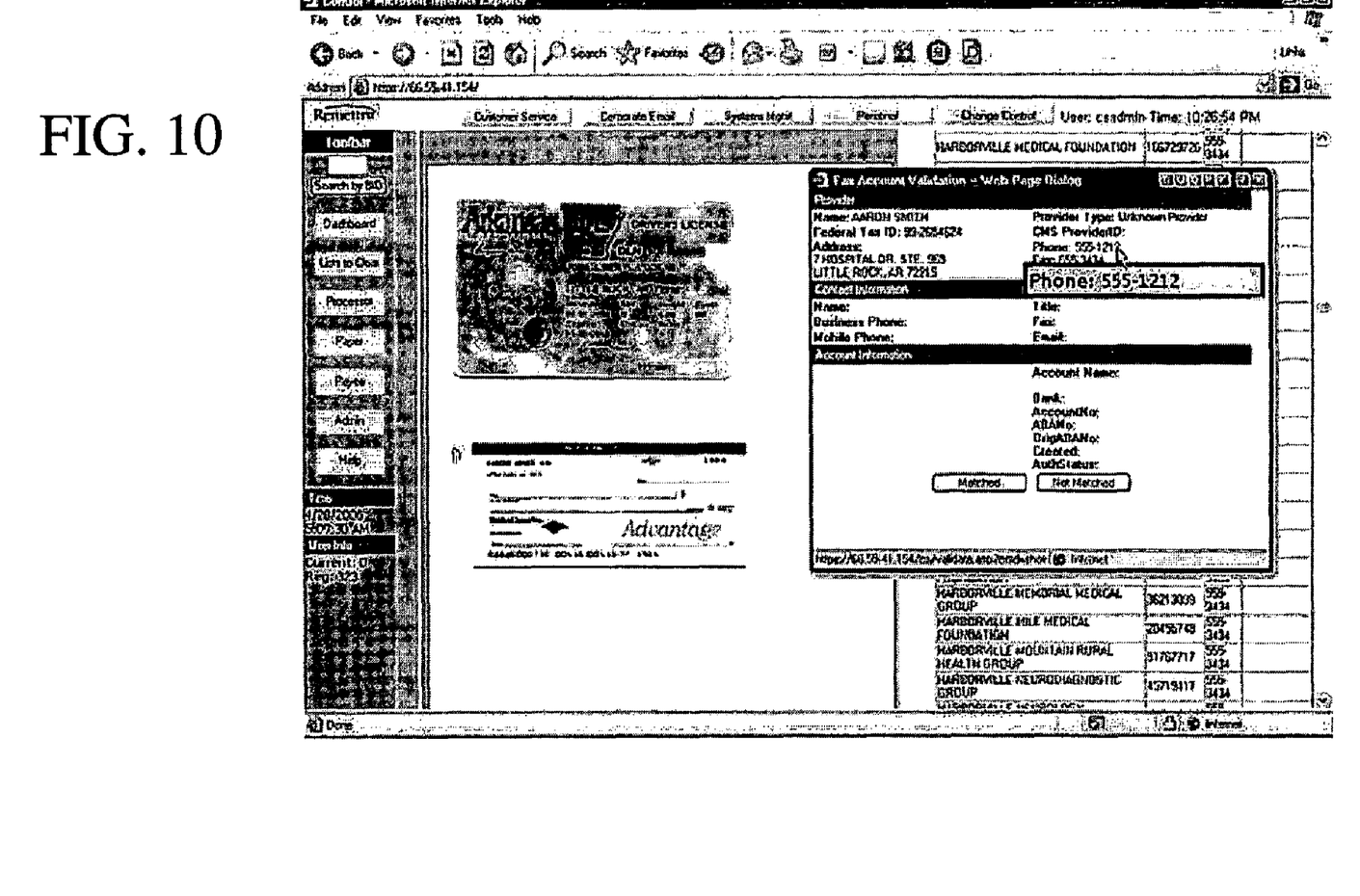
FIG. 10 is a screen print showing an example of a display presented to a customer support representative for comparing information provided by the user during an online session and information from the forms of FIGS. 2-4 faxed by the user.

A customer support representative begins the process of visually verifying the credentials at step 18. A GUI program is started that will bring up images of the identification documents in the order that they have been received at step 20. Using the linkage created from the bar code ID 11 on the application package, the user's account will be automatically displayed at step 22 on the right hand pane while corresponding image data is displayed on the left to easily accommodate visual verification at step 24. An example of a display presented to the customer support representative is shown in FIG. 10. Processing of the faxed registration information is in the order received, with the existing account information already linked. This advantageously eliminates the need of the customer support representative from finding the proper account from hand written information and search for the proper account to activate.

Once the first customer support representative is satisfied that the faxed credentials match the information provided during online registration at step 6, the first customer support representatives activates the bank account at step 26. The record is queued for a second representative for verification of the account at step 28 for a second time. The second customer support representative goes through the same steps as the first customer support representative to verify the faxed information with the information secured online. Like the first customer support representative, the second customer support representative's responsibility is to verify that the electronic records match the provided faxed credentials, company name, individual name, routing and transit number, and bank account number. In the event that there is something wrong with the user's credentials, the first and/or second customer support representative may elect to repair simple problems with supervisor approval, void the existing account at step 30, or initiate a fraud investigation at step 32. The second customer support representative also processes the faxed information in the order received.

Using two customer support representatives to verify the account advantageously increases the accuracy of the authorization process and reduces the possibility of fraud. The customer support representatives do not know if they are performing the first verification or the second verification in the account verification process. Both customer support representatives must activate the account. If one of the customer support representatives fails to verify the account, the account does not get activated.

Once the second verification at step 34 is completed, the account becomes active is now authorized to receive funds electronically at step 36.

Figure 7:
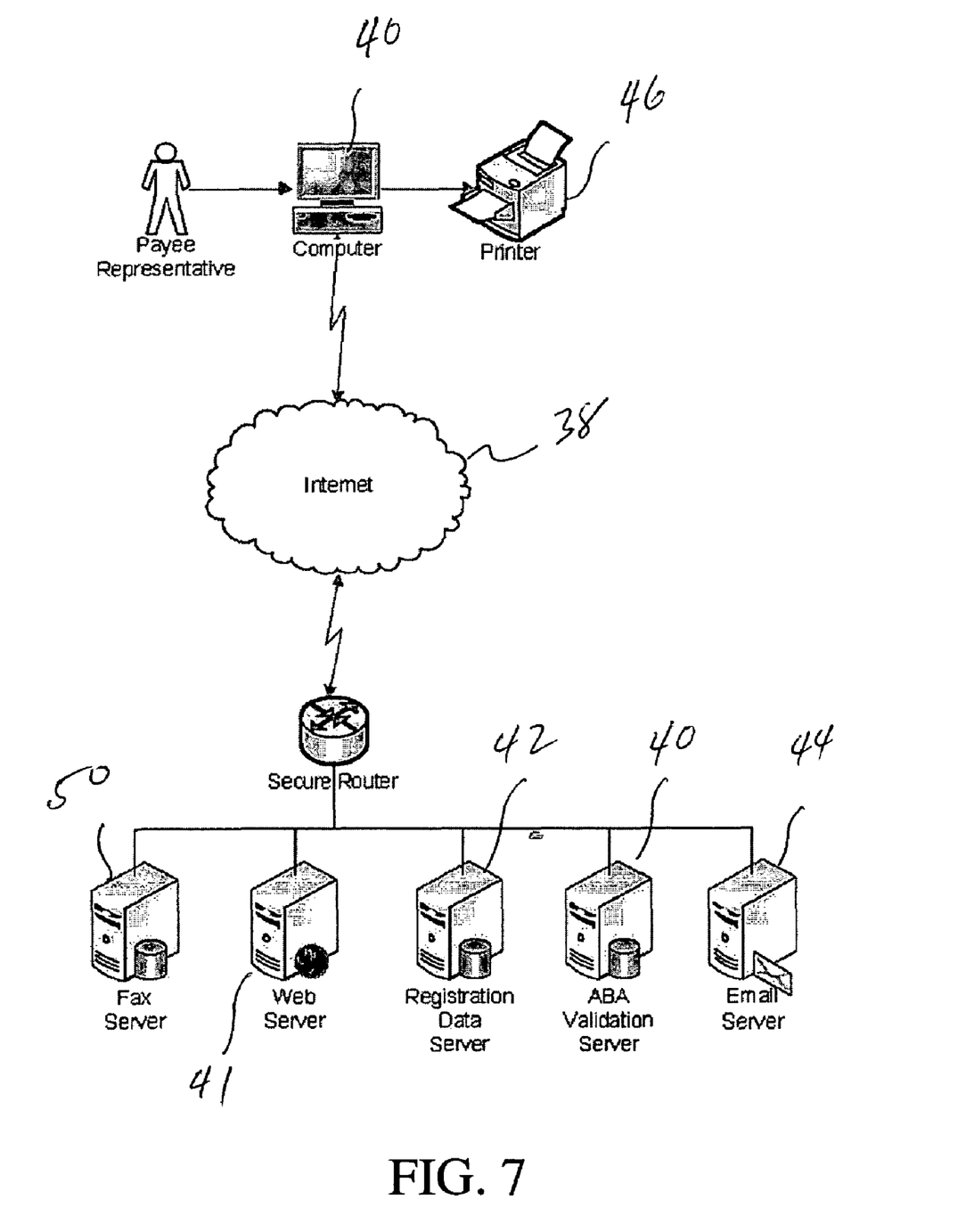
FIGS. 7-9 show an exemplary system for implementing the various stages of the method of FIG. 1.
Figure 8:
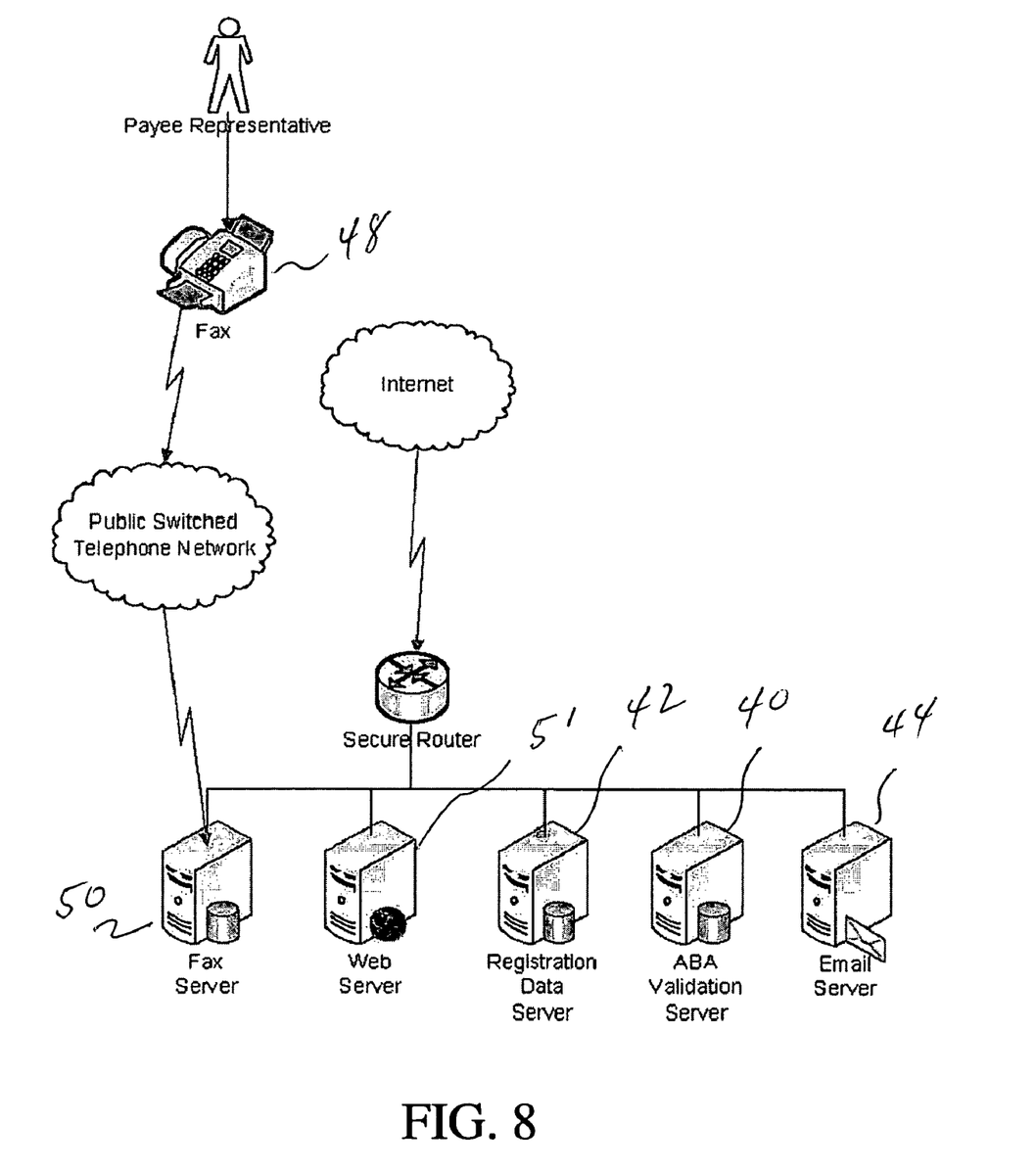
Figure 9:
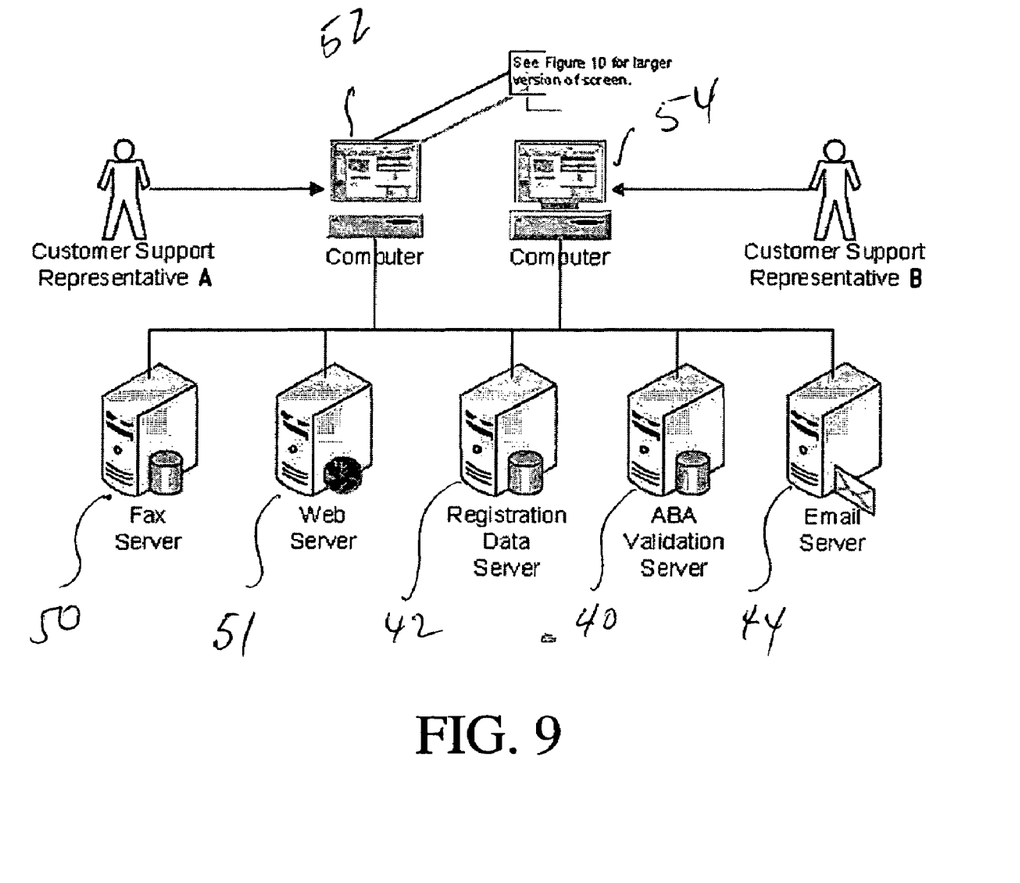

An exemplary system for implementing the process 2 is disclosed FIGS. 7-9. Referring to FIG. 7, the payee representative (user) connects to the internet 38 via a computer work station 40. The payee representative then navigates to the website hosted by a webserver 41. The payee representative securely signs on using existing client ID, user ID and password, such as shown in FIG. 5. The payee representative begins the bank registration by completing the on-line web-based form with the requested banking information, such as shown in FIG. 6.

The system validates the given bank routing number using an ABA validation server 40. The payee entered bank information and linked unique client ID are stored in registration data server 42. The system builds the custom bank account verification forms package with unique bar-coded client ID included on each page of the package. The forms package is shown in FIGS. 2, 3 and 4. The package is electronically delivered to the payee representative via an e-mail server 42 and via an on-line web application as a PDF document. The payee representative then prints the forms package with a printer 44.

The payee representative completes the printed bank account verification forms package including copies of government issued photo ID and canceled check (see FIGS. 2-4). The payee representative then faxes the completed forms to a fax number provided in the instruction form shown in FIG. 2. A fax machine 48 is connected via the public switch telephone network to a fax server 50. The system receives the faxed information via the fax server 50. Bar-coded client ID is electronically extracted from the faxed images. The electronic version of the faxed pages, its associated client ID (from bar code extract), and dates/time information is stored in registration data server 42. The faxed record is linked to the original bank registration information stored during the user's previous on-line session. Customer support personnel are electronically notified of newly bank account verification forms package.

Customer support representative A receives notification via the system intranet application/monitoring system regarding newly received bank account verification forms package. Customer support representative A begins the verification process by selecting new faxed record. The intranet application displays the faxed images along with the linked payee registration data, such as shown in FIG. 10. Customer support representative A uses a computer 52 linked to the system. Customer support representative A uses applications and tools to verify information stored in the online registration data record matches information submitted via fax. Information verified includes at a minimum the payee representative's name on the account and on the photo ID, his signature, and the routing number and bank account on file compared with the check image. Customer support representative A indicates match if all information is verified as correct. The registration data record is then updated to reflect that one verification is complete and another verification is needed to complete the registration Customer support representative B using computer 54 repeats the steps of customer support representative A as noted above. Once completed and verified, the registration data record is updated to reflect that two verifications have been completed. Bank account registration is now complete.

Each account is independently verified by two different customer support representatives. The representatives do not know if they are first or second individual to verify the bank and payee representative's information. Two support representatives as shown are a minimum requirement. More than two representatives may be used. The customer representative workflow is independent of the web functions used to collect banking information from payee representatives.

The method and system of the present invention configures and expands the authority of a user account to allow a user to receive banking payment transactions electronically. The method and system configure and control account access allowing authorized users to choose which bank and which account will be credited for payments. The user must know his bank routing and transit number, account number, has a cancelled check or savings account deposit slip as well as a government issued photo ID. The name on the individual's government issued photo ID must match the name of the user's name when the account was first registered. This information and a personalized bar-coded identifier are used to authenticate the user's ability to accept payments at this account. The telephone number that they use to contact us may also be used.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims. For example, alternative applications may include: an additional step to initiate a pre-note transaction or, the exclusion of an already established password-protected user account.

We claim:

1. A computer-implemented method for collecting bank account information from an individual and authenticating the individual prior to allowing the bank account to receive an electronic fund transfer, comprising:
   a) providing a website;
   b) allowing the individual to access the website;
   c) allowing the individual to enter bank account information on the website to which funds will be transferred;
   d) delivering application forms with a unique bar-coded identifier over the internet to the individual in response to step c);
   e) electronically receiving and storing the application forms after being completed by the individual and linking the bar coded identifier with the individual's bank account information;
   f) visually comparing by at least first and second customer support representatives information provided on the application forms with information provided at step c) to verify the identity of the individual, said comparing by the at least first and second customer representatives is done without knowledge of whether either customer representative has already verified the identity of the individual; and
   g) validating payment to the individual if the individual's identity is verified by the at least first and second customer support representatives at step f).

2. The method as in claim 1, wherein said bank account information includes bank account and routing numbers.

3. The method of claim 2, and further comprising the step of verifying the routing number against an ABA database.

4. The method of claim 2, and further comprising the step of linking the government issued ID with the existing individual's bank account information generated at step c).

5. The method of claim 2, and further comprising the step of linking the individual's bank account information from the received application forms with the existing individual's records generated at step c).

6. The method of claim 1, wherein the application forms include an instruction page, a registration images form and an ACH authorization form.

7. The method of claim 1, wherein the step of visually comparing is implemented in the order received.

8. The method of claim 1, wherein the step of visually comparing includes verifying the name on account, name on photo ID, routing and bank account number.

9. The method of claim 1, and further comprising the step of automatically linking the received application forms with the existing individual's records generated at step c).

10. The method as in claim 1, wherein said step of allowing access includes obtaining a password protected user account at the website.

11. The method as in claim 10, wherein said step of allowing access includes allowing the individual to sign on at the website using the password protected user account.

12. The method as in claim 1, wherein said step of electronically receiving and storing is implemented by a fax server.

13. A system for collecting and authenticating a bank account information from an individual prior to an electronic fund transfer to the individual's bank account, comprising:
   a) a web server for allowing the individual to obtain a password protected user account;

b) a registration data server for storing the individual's user account information, and bank account and routing numbers;
c) an email server for delivering application forms to the individual via the internet;
d) another server for electronically receiving the application forms after being completed by the individual;
e) a first workstation for providing side by side visual display of information provided on the received application forms with the information provided by the individual during a previous online session to allow a first customer support representative to authenticate the identity of the individual; and
f) at least a second workstation for providing side by side visual display of information provided on the received application forms with the information provided by the individual during a previous online session to allow at least a second customer support representative to authenticate the identity of the individual, whereby approval by the first and the at least second customer support representatives without knowledge of each other's approval are required to activate the individual's bank account for receiving payments.

14. A system as in claim 13, and further comprising a connection to an ABA validation server for validating the individual's bank and routing numbers.

15. A system as in claim 13, wherein said another server is a fax server.

* * * * *